US006842825B2

(12) United States Patent
Geiner et al.

(10) Patent No.: US 6,842,825 B2
(45) Date of Patent: Jan. 11, 2005

(54) ADJUSTING TIMESTAMPS TO PRESERVE UPDATE TIMING INFORMATION FOR CACHED DATA OBJECTS

(75) Inventors: Robert Vaughn Geiner, Raleigh, NC (US); Ronald Maynard Kern, Tucson, AZ (US); Gregory Edward McBride, Tucson, AZ (US); William Frank Micka, Tucson, AZ (US); Jeffrey Mark Nick, West Park, NY (US); Larry Richard Perry, Gilroy, CA (US); David B. Petersen, Great Falls, VA (US); David Michael Shackelford, Tucson, AZ (US); Harold Glen Slone, Los Gatos, CA (US); Harry Morris Yudenfriend, Poughkeepsie, NY (US); Douglas M. Zobre, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 10/214,842

(22) Filed: Aug. 7, 2002

(65) Prior Publication Data

US 2004/0030837 A1 Feb. 12, 2004

(51) Int. Cl.[7] .......................... G06F 12/00; G06F 12/16
(52) U.S. Cl. .................. 711/133; 711/100; 711/118; 711/141; 711/162; 707/201; 707/204; 714/6; 713/501
(58) Field of Search ................................ 711/100, 118, 711/112, 133, 141, 161, 162; 707/201, 204; 714/6; 713/400, 501, 502

(56) References Cited

U.S. PATENT DOCUMENTS

| | | | |
|---|---|---|---|
| 5,455,944 A | 10/1995 | Haderle et al. | |
| 5,594,900 A | 1/1997 | Cohn et al. | |
| 5,636,360 A | 6/1997 | Courts et al. | |
| 5,734,818 A | 3/1998 | Kern et al. | |
| 5,737,600 A | 4/1998 | Geiner et al. | |
| 6,044,444 A | 3/2000 | Ofek | |
| 6,125,393 A | 9/2000 | Clark et al. | |
| 6,260,125 B1 | 7/2001 | McDowell | |
| 6,260,129 B1 * | 7/2001 | Crockett et al. | 711/170 |
| 6,301,643 B1 | 10/2001 | Crockett et al. | |
| 6,446,175 B1 * | 9/2002 | West et al. | 711/162 |
| 6,463,501 B1 * | 10/2002 | Kern et al. | 711/100 |
| 6,484,187 B1 * | 11/2002 | Kern et al. | 707/204 |
| 6,487,645 B1 * | 11/2002 | Clark et al. | 711/162 |
| 6,587,933 B2 * | 7/2003 | Crockett et al. | 711/154 |
| 6,687,793 B1 * | 2/2004 | Thomas et al. | 711/133 |
| 2001/0011324 A1 * | 8/2001 | Sakaki et al. | 711/112 |
| 2002/0103980 A1 * | 8/2002 | Crockett et al. | 711/162 |
| 2003/0028723 A1 * | 2/2003 | Segev et al. | 711/113 |
| 2003/0177322 A1 * | 9/2003 | Crockett et al. | 711/161 |

* cited by examiner

*Primary Examiner*—Mano Padmanabhan
*Assistant Examiner*—Jasmine Song

(57) ABSTRACT

In a system including a host, a primary storage subsystem coupled to the host, a cache coupled to the host and separate from the primary storage system, a secondary storage subsystem, and a data mover coupling the primary and secondary storage systems, data is temporarily cached for future storage in the primary storage subsystem so as to preserve timestamp information and maintain data consistency for asynchronously mirroring the data at a secondary subsystem.

21 Claims, 8 Drawing Sheets

ADJUSTING TIMESTAMPS TO PRESERVE UPDATE TIMING INFORMATION FOR CACHED DATA OBJECTS

BACKGROUND

1. Field of the Invention

The present invention relates to asynchronous data mirroring systems. More particularly, one aspect of the invention concerns a method of temporarily caching data for storage in a primary storage subsystem for asynchronous mirroring at a secondary storage subsystem without sacrificing timestamp information.

2. Description of Related Art

For many businesses, governments, and other computer users that update and store data at a primary site, it is essential to maintain a backup copy of the data at a secondary site that is physically remote from the primary site. This permits recovering data from the secondary site in the event of an equipment failure or other disaster, for example a fire or explosion, that damages or destroys data at the primary site. Copying data to a remote secondary site as a backup for disaster recovery is referred to as data shadowing, data mirroring, data duplexing, or remote copying. In order to be able to accurately restore a database after a disaster, it is important to maintain the data, which can include database log data and database table data, in an order at the secondary site, which is sequentially consistent with the order of the data at the primary site. This is referred to as maintaining data consistency. Also, it is generally desirable to minimize any performance degradation at the primary site resulting from employing data shadowing.

The two main categories of remote data shadowing are referred to as "synchronous" and "asynchronous" data shadowing. With synchronous data shadowing, any given data update is stored at both the primary and secondary sites before permitting the next update to be written to storage at the primary site. Thus, the data at the secondary site is updated synchronously with data at the primary site. A data update can include new or updated data object such as a record, record set, file, linked list, or any other data structure.

The International Business Machines (IBM) Peer-to-Peer Remote Copy (PPRC) facility is an example of a synchronous remote data shadowing system With PPRC, data at the remote secondary site is updated in the same sequence as data at the primary site, and consequently data at the secondary site is inherently synchronized with data at the primary site. When an application running on a host at the primary site writes a data update to a volume on a Direct Access Storage Device (DASD) at the primary site, a storage controller at the primary site stores the update in the DASD at the primary site. The storage controller at the primary site also forwards the update to a secondary storage controller at the secondary site for storage on a DASD volume at the secondary site. Next, the secondary storage controller notifies the primary storage controller that the secondary storage controller has received the update, and then the primary storage controller notifies the primary host that the update has been completed. Consequently, after a data update, processing the next transaction or input/output (I/O) is delayed, because the primary storage controller does not notify the primary host that the update is complete until the primary storage controller receives confirmation from the secondary storage controller that the secondary storage controller has received the update. This delay becomes larger as the distance between the primary and secondary sites is increased, and can effectively limit the maximum distance between the primary and secondary sites to about 40 kilometers.

In contrast to synchronous data shadowing, with asynchronous data shadowing more than one data update can be written to storage at the primary site before any data updates are sent to the secondary storage site. Thus, with asynchronous data shadowing, the data updates at the secondary site generally occur asynchronously in relation to the updates at the primary site.

The IBM Extended Remote Copy (XRC) facility is an example of an asynchronous remote data shadowing system. With the XRC facility, when an application running on a host at the primary site sends a request to a storage controller at the primary site to store a data update on a volume on a DASD at the primary site, the storage controller stores the update in the DASD, and also stores the data update in a sidefile in the storage controller at the primary site A storage controller can have one or more sidefiles, and each sidefile corresponds with a "controller session". Each data update is stored with a timestamp that identifies the time that the host application made the request to store the data update. The timestamps permit placing the data updates in the sidefile, and other data updates in other sidefiles, in sequence consistent order when they are stored at the secondary site. XRC employs a "system data mover" server, which runs a program that gathers a group of data updates from sidefiles in one or more storage controllers at the primary site. Using the timestamps, the data mover places the updates into sequence consistent groups referred to as "consistency groups". The group of storage controller sessions corresponding to the sidefiles from which XRC gathers data to form consistency groups are referred to as an XRC "session."

Consistency groups are groups of data updates that are grouped together because they occurred during the same time interval. To facilitate the formation of consistency groups, the latest timestamp for each controller session is saved in the storage controller. When forming consistency groups, XRC ignores the timestamps from controller sessions that have not had any data updates for a prescribed amount of time, for example one second, which is referred to as "idle" controller sessions. The data mover repeatedly forms, and then transmits, consistency groups of data updates to a storage controller at the secondary site. The storage controller at the secondary site receives data updates in each consistency group and stores them in sequence consistent order in volume(s) on DASD(s) at the secondary site. As a result of using consistency groups, the DASD(s) at the secondary site are updated in the same sequence as the DASD(s) at the primary site. Forming consistency groups, and other relevant information, is described in U.S. Pat. No. 5,734,818, issued Mar. 31, 1998, titled "Forming Consistency Groups Using Self-describing Data Objects For Remote Data Duplexing", and in U.S. Pat. No. 6,301,643, issued Oct. 9, 2001, titled "Multi-environment Data Consistency", the entirety of which are incorporated herein by reference.

With XRC, the primary storage controller notifies the host that a data update has been completed soon after the primary storage controller receives the update from the host, without waiting for any communication from the secondary site. Accordingly, the primary host is free to process the next transaction or I/O, very soon after sending a data update to the primary storage controller.

Consequently, an asynchronous remote data shadowing system, such as XRC, can provide better performance than a synchronous remote data shadowing system, such as PPRC. Although systems such as XRC provide significant utility and also enjoy widespread commercial success today, IBM engineers are nonetheless seeking to improve the performance and efficiency of such remote data shadowing systems. In this regard, advances in speed and efficiency of data shadowing are continually sought.

SUMMARY

Broadly, one aspect of the present disclosure concerns a method of temporarily caching data for storage in a primary storage subsystem for asynchronous mirroring at a secondary storage subsystem without sacrificing timestamp information. This method is performed in a system including a host, a primary storage subsystem coupled to the host, a host-connected cache separate from the primary storage system, a secondary storage subsystem, and a data mover coupling the primary and secondary storage sub systems.

The host designates, receives, or otherwise identifies various data objects for storage in the primary storage subsystem. The host stores some of the identified data objects in the cache with an original timestamp correlated to the time of storage in cache. For other data objects, the host sends them directly to the primary subsystem for storage, and the primary storage system responds by storing these data objects in association with current timestamps correlated to a time of storage in the primary storage subsystem.

Under a predetermined schedule, the host sends ("destages") cached data objects to the primary subsystem for storage therein and also commands the primary storage subsystem to store each data object in association with an advanced timestamp comprising the original timestamp increased by a predetermined margin of sufficient amount so as to be recognizable as an advanced timestamp. Later, when data from the primary storage is collected for storage at the secondary storage subsystem, the original timestamp can be reconstructed from the advanced timestamp.

The system of the present disclosure affords its users with a number of distinct advantages. Chiefly, this system provides performance advantage by quickly storing data objects in a cache. Another advantage is realized by preserving timestamp information indicating when the data objects were updated and written to the cache. The disclosed system facilitates maintaining cached and non-cached data objects in sequence consistent order even if data objects that are dependent on cached data objects, are written to a primary storage before the cached data objects are written to the primary storage. The invention also provides a number of other advantages and benefits, which should be apparent from the following description.

DETAILED DESCRIPTION

Figure 1:
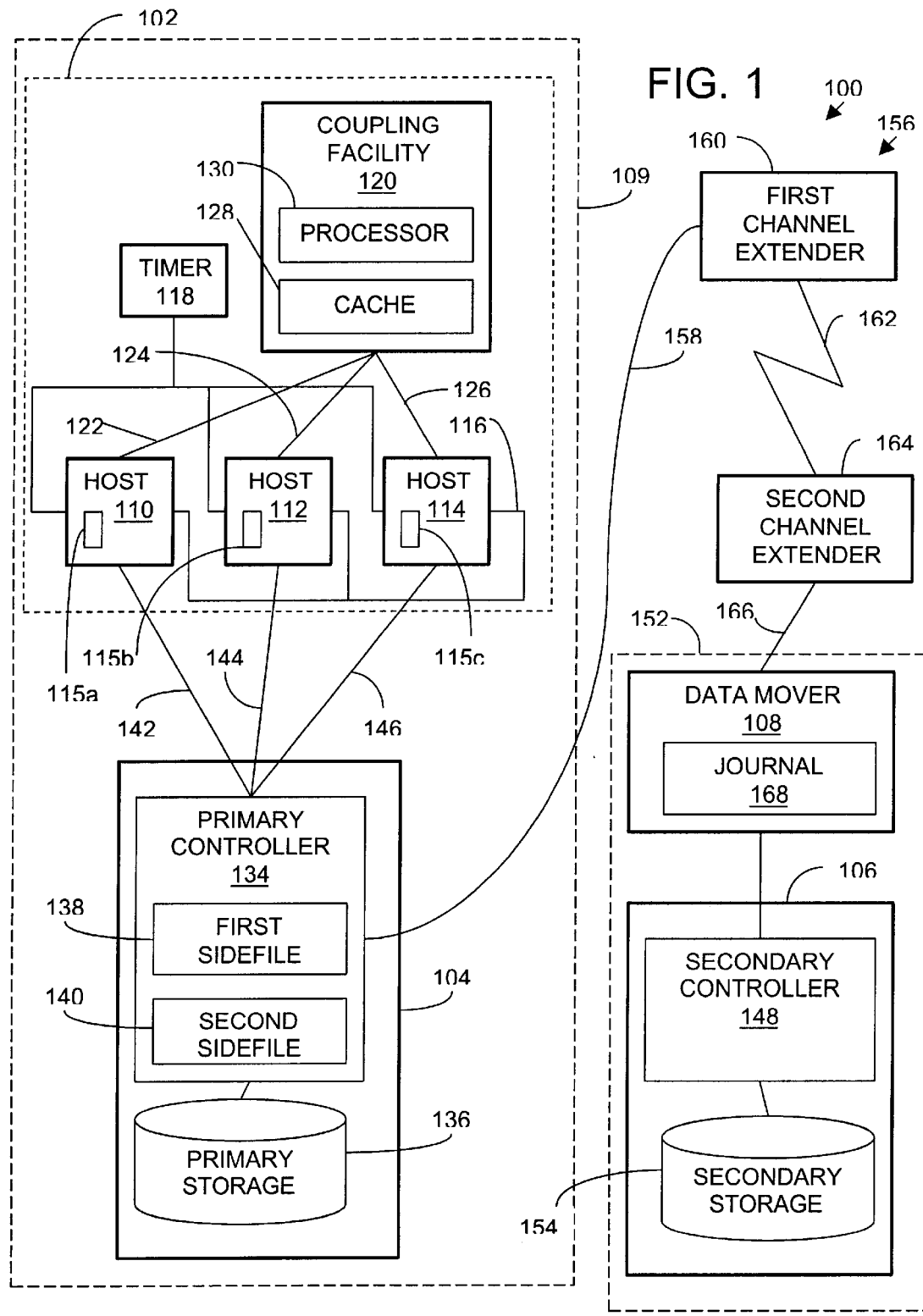
FIGS. 1-4 show block diagrams of the hardware components and interconnections of a data storage system in accordance with different illustrative embodiments.

The nature, objectives, and advantages of the invention will become more apparent to those skilled in the art after considering the following detailed description in connection with the accompanying drawings.

Hypothetical Problems Related to Using a Cache in an Asynchronous Data Mirroring System As mentioned above, an asynchronous data shadowing system such as XRC can generally provide better performance than a synchronous data shadowing system such as PPRC. Seeking to further improve performance when using XRC, the inventors considered the innovative and previously unforeseen idea of using a host level cache in a remote data shadowing environment in order to temporarily store some data updates in the cache prior to writing the cached data updates to DASD volume(s) at the primary site. Caches are commonly used within primary and secondary data storage subsystems, but the inventors discovered that using a host level cache (i.e. accessible by the host apart from the primary storage subsystem) is fraught with problems. Namely, there would be significant problems with maintaining sequence consistent order between data temporarily stored in the cache and other that is written directly to the primary storage, and particularly when that data is dependent on the data stored in the cache.

Remote data shadowing systems such as XRC, which are disk based, require writing data to volumes at the primary site before the data is sent to the secondary site. Consequently, data cannot be mirrored directly from a cache. XRC maintains sequence consistent order between data on primary volumes at the primary site and data on secondary volumes at the secondary site by applying data updates to the secondary volumes in the order they were applied to the primary volumes. Data within the primary volumes must also be maintained in sequence consistent order. In systems prior to this invention, this is accomplished by always writing data from which other data depends to the primary storage before the dependent data is written to the primary storage.

The inventors found that if some data were to be temporarily stored in a cache in the host machine (or another layer above the primary storage subsystem), the cached data would not be maintained in sequence consistent order in relation to other data written directly to primary volumes. Since the other data would be written directly to the primary volumes while the cached data is in the cache, the cached data would be out of order with the data written directly to the primary volumes when the cached data is subsequently written to the primary volumes. More specifically, sequence consistent ordering would not be maintained because data that is temporarily stored in the cache must later be written to a primary volume, and known I/O routines that perform the act of writing to a primary volume always create a timestamp of the time that the data is written to the primary volume. Thus, for previously cached data, the time that the data was updated by the application and originally stored in the cache would be lost.

As a more particular example, in the IBM XRC product the host utilizes a host operating system subcomponent called "START I/O EXIT" to write data to primary storage. Regardless of the point of origin of the data to be written (a host application or as proposed by the inventors a host level cache), the START I/O EXIT routine inserts the system timestamp (as of the time the START I/O EXIT routine is executed) into a metadata field that is included in a command sent to a disk storage controller at the primary storage subsystem. The primary storage controller thus associates this system timestamp (i.e., the time the exit program is executed) with the data object that comes from the cache. Thus, the timestamp associated with a data object that had been stored in the cache would indicate the time the cached data object was written to a primary storage, rather than the earlier time when the data object was updated by an application and written to cache. Consequently, because the timestamp associated with the cached data object would not accurately indicate the time the cached data object was updated, the cached data object would not necessarily be maintained in sequence consistent order in primary storage with other data objects that are dependent on the cached data object, and which are written directly to primary storage. The data would fail to observe sequence consistent order when the XRC data mover sends the data from primary storage to secondary storage.

The inventors also found that sequence consistent order also might be lost if there were nothing to guarantee the writing of cached data updates to primary storage by the time that later data updates in primary storage are grouped from sidefiles into consistency groups and sent to secondary storage. If the cache contained any data that was updated during a time interval corresponding to a consistency group, and if that cached data had not been written to primary storage when XRC formed the consistency group, the cached data would be left out of the consistency group. Consequently, the data in the cache would not be maintained in sequence consistent order with other data.

Accordingly, there would be a number of challenges and difficulties to overcome in utilizing a cache with a remote data shadowing system. In order to realize certain performance improvements in remote data shadowing systems, the present inventors have introduced the developments described hereinbelow to add on and overcome these challenges.

Hardware Components and Interconnections

Data Storage System Structure

FIRST EXAMPLE

One aspect of the invention concerns a data storage system configured to provide improved performance. As an example, the system 100 may be embodied by various hardware components and interconnections as shown in FIG. 1. More specifically, the system 100 includes a cluster subsystem 102, a primary storage subsystem 104, a secondary storage subsystem 106, and a data mover 108.

The cluster subsystem 102 is located at a primary site 109. The cluster subsystem 102 includes host computers 110, 112, 114, which are also called "hosts". The hosts 110, 112, 114 are interconnected with host links 116, which may comprise, for example, Coupling Links, Internal Coupling Channels, an Integrated Cluster Bus, or other suitable links. Rather than using three hosts 110, 112, 114 as in the illustrated example, in alternative embodiments one, two, four, or more hosts may be used.

Each host 110, 112, 114 is implemented by a digital processing unit, for example, a mainframe computer, computer workstation, server computer, personal computer, supercomputer, microprocessor, or other suitable machine. Each host 110, 112, 114 may be implemented with the same type of digital processing unit (or not). In one specific example, the hosts 110, 112, 114 each comprise an IBM zSeries Parallel Sysplex server, such as a zSeries 900, running the z Operating System (z/OS). Another example of a suitable digital processing unit is an IBM S/390 server running OS/390. The hosts 110, 112, 114 run one or more application programs that generate data objects, which are stored external from the hosts in the primary storage subsystem 104. Alternatively, data objects may be stored internal to one or more of the hosts 110, 112, 114. The data objects may comprise new data or updates to old data. "Update" may also be used to refer to any data items received for storage in the primary subsystem 104. The host application programs may include, for example, IMS and DB2. The hosts 110, 112, 114, run software that includes respective I/O routines 115a, 115b, 115c, which are discussed below. As an example, the I/O routines 115a, 115b, 115c may comprise a subpart of the operating system(s) running on the hosts 110, 112, 114 such as the START I/O EXIT routine of the host operating system.

The cluster subsystem 102 also includes a timer 118 that is coupled to each of the hosts 110, 112, 114, to synchronize the timing of the hosts 110, 112, 114. In one example, the timer 118 is an IBM Sysplex® Timer. Alternatively, a separate timer 118 may be omitted, in which case a timer in one of the hosts 110, 112, 114 is used to synchronize the timing of the hosts 110, 112, 114.

The cluster subsystem 102 further includes a coupling facility 120, which is coupled to each of the hosts 110, 112, 114 by a respective connector 122, 124, 126. The connectors 122, 124, 126, may be, for example, Inter System Coupling (ISC), or Internal Coupling Bus (ICB) connectors. The coupling facility 120 includes a cache storage 128 ("cache") shared by the hosts 110, 112, 114, and also includes a processor 130. In one specific example, the coupling facility 120 is an IBM z900 model 100 Coupling Facility. Examples of other suitable coupling facilities include IBM model 9674 C04 and C05, and IBM model 9672 R06. Alternatively, the coupling facility 120 may be included in a server, such as one of the hosts 110, 112, 114. As an example, some suitable servers for this alternative embodiment include IBM z900 and S/390 servers, which have an internal coupling facility or a logical partition functioning as a coupling facility. Alternatively, the coupling facility 120 may be implemented in any other suitable server. As an example, the processor 130 in the coupling facility 120 may run the z/OS. Alternatively, any suitable shared memory may be used instead of the coupling facility 120.

Although caches (not shown) are used in the primary and second storage subsystems 104, 106, the cache 128 is different. It is a host-level cache in that it is accessible by the hosts 110, 112, 114 independent of the primary storage subsystem 104. The cache 128 is not under control of the subsystem 104. Rather, the cache 128 comprises another unit, like the subsystem 104, under the control of the hosts 110, 112, 114, and may even be included in the host machine if desired.

The primary storage subsystem 104, which is located at the primary site 109, includes a primary (storage) controller 134 coupled to a primary storage 136 and to the hosts 110, 112, 114. In the illustrated example, the primary controller 134 has a first sidefile 138 and a second sidefile 140. Alternatively, the primary controller 134 may have only a single sidefile, or may have more than two sidefiles. In other alternative embodiments, the primary storage subsystem 104 includes one or more additional storage controllers (not shown) that are coupled to the hosts 110, 112, 114 and to the primary storage 136, or to additional primary storage. Each additional storage controller may have one or more sidefiles.

In the illustrated example, the hosts 110, 112, 114 are each coupled to the primary controller 134 with a respective link, such as an ESCON (Enterprise Series Connection) or FICON link 142, 144, 146. In an alternative embodiment, the hosts 110, 112, 114 are also coupled to the secondary controller 148.

The secondary storage subsystem 106, which is located at a secondary site 152, includes the secondary storage controller 148, which is coupled to a secondary storage 154. Alternatively, additional storage controllers and/or additional storage may be included in the secondary storage subsystem 106.

The primary storage 136 and the secondary storage 154 may each be implemented with any type of nonvolatile data store, for example, one or more DASDs or tapes employing magnetic or optical storage, such as RAMAC units, RAID arrays, "hard drives", CD-ROMs, WORMs, DVDs, digital optical tapes, battery supported circuit memory, or magnetic tapes.

In one example, the primary storage subsystem 104 and the secondary storage subsystem 106 each comprise IBM 2105 Enterprise Storage Servers. In another example, the primary storage subsystem 104 and the secondary storage subsystem 106 each include an IBM 3990 model 6 storage controller coupled to an IBM model 3390 RAMAC storage. The secondary storage subsystem 106 may be implemented with different hardware than the primary storage subsystem 104. For example, the secondary storage 154 may be implemented with storage hardware that is different but geometrically compatible with the primary storage 136. An example of geometric compatibility is where each disk has 50 kilobytes per track. Alternatively, the secondary storage 154 may be geometrically incompatible with the primary storage 136, in which case data is reformatted to maintain sequence consistent order. The volume serial numbers and DASD addresses may be the same or different at the primary and secondary sites.

In the illustrated example of FIG. 1, the data mover 108 is located at the secondary site 152. The primary controller 134 is coupled to the data mover 108 by a link 156. In the illustrated example, the link 156 is an extended link, comprising a first ESCON or FICON link 158 coupled to a first channel extender 160, a communications link 162, a second channel extender 164, and a second ESCON or FICON link 166. The primary controller 134 is coupled to the first ESCON or FICON link 158, and the data mover 108 is coupled to the second ESCON or FICON link 166. The communications link 162 may include, for example, wires, cables, fiber optic lines, wireless links, satellite links, or telephone lines, and may be implemented with, for example, DS1, DS3, or OC48. In an alternative embodiment, link 156 is an ESCON or FICON link, or other suitable link. An ESCON link may be utilized for distances up to about 60 kilometers, a FICON link may be used for longer distances, for example up to about 100 kilometers, and an extended link may be used for greater distances, for example, hundreds or thousands of kilometers. The data mover 108 is also coupled to the secondary controller 148, with any type of suitable connection, for example, an ESCON or FICON link.

As an example, the data mover 108 may be implemented with an IBM zSeries server. However, generally any sufficiently powerful digital data processing apparatus could be used. In the illustrated example, the data mover 108 includes a journal 168, and both the data mover 108 and the journal 168 are located at the secondary site 152. The journal 168 comprises nonvolatile storage, for example, one or more RAMAC units, RAID arrays, "hard drives", CD-ROMs, WORMs, DVDs, or other type of DASD. Alternatively, the journal 168 may be omitted.

SECOND EXAMPLE

Figure 2:
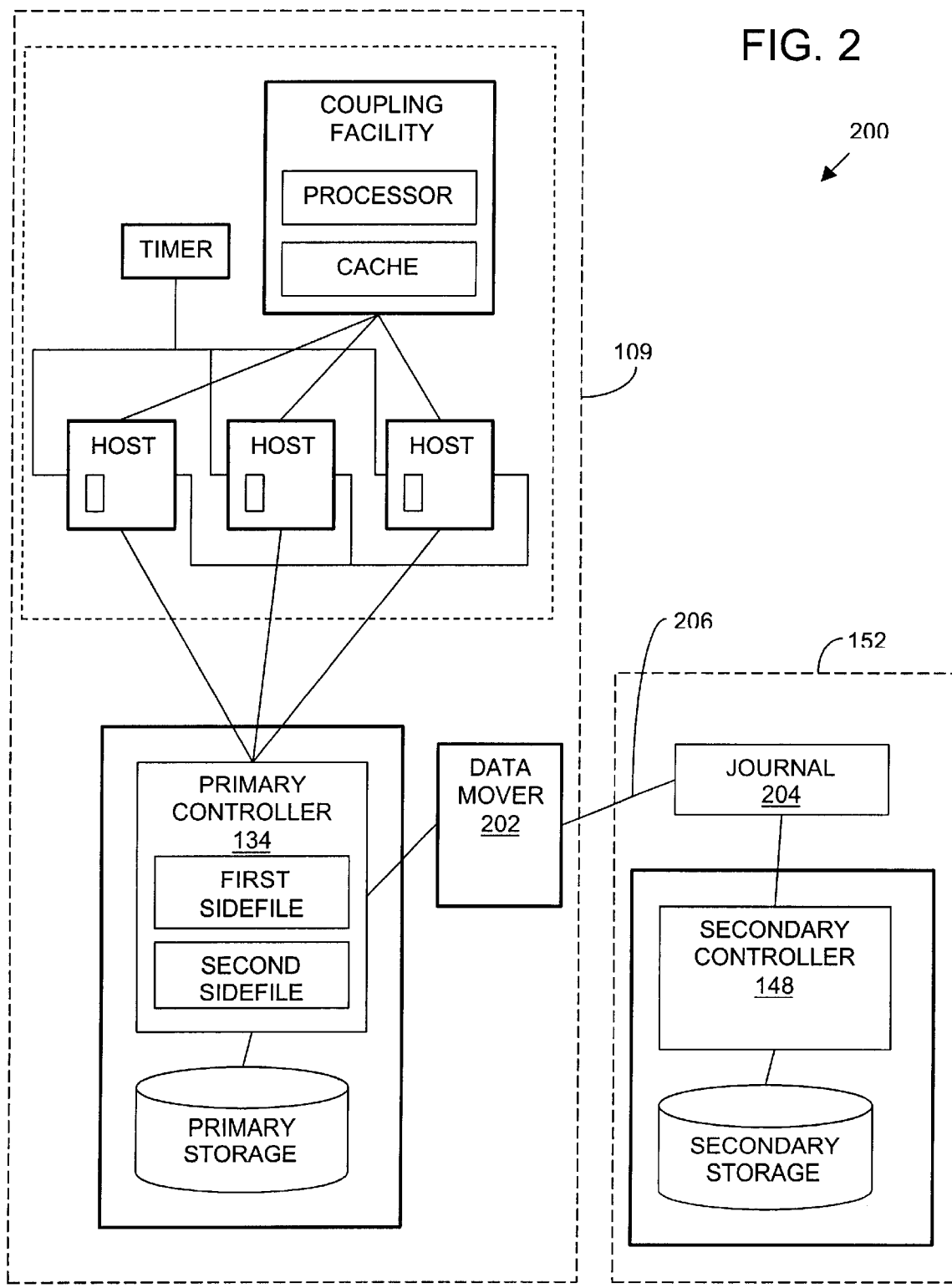

In an alternative system 200 shown in FIG. 2, the data mover 202 does not include a journal. In FIG. 2, the data mover 202 is located at the primary site 109 and a separate journal 204 is located at the secondary site 152. In this alternative embodiment, the data mover 202 is coupled to the journal 204 by a link 206. The data mover 202 is also coupled to the primary controller 134. In one example, link 206 comprises an extended link as described above. In another embodiment, the link 206 is an ESCON or FICON link, or other suitable link. The journal 204 is coupled to the secondary controller 148. As an alternative, the journal 204 is omitted, and the data mover 202 is coupled directly to the secondary controller 148.

THIRD EXAMPLE

Figure 3:
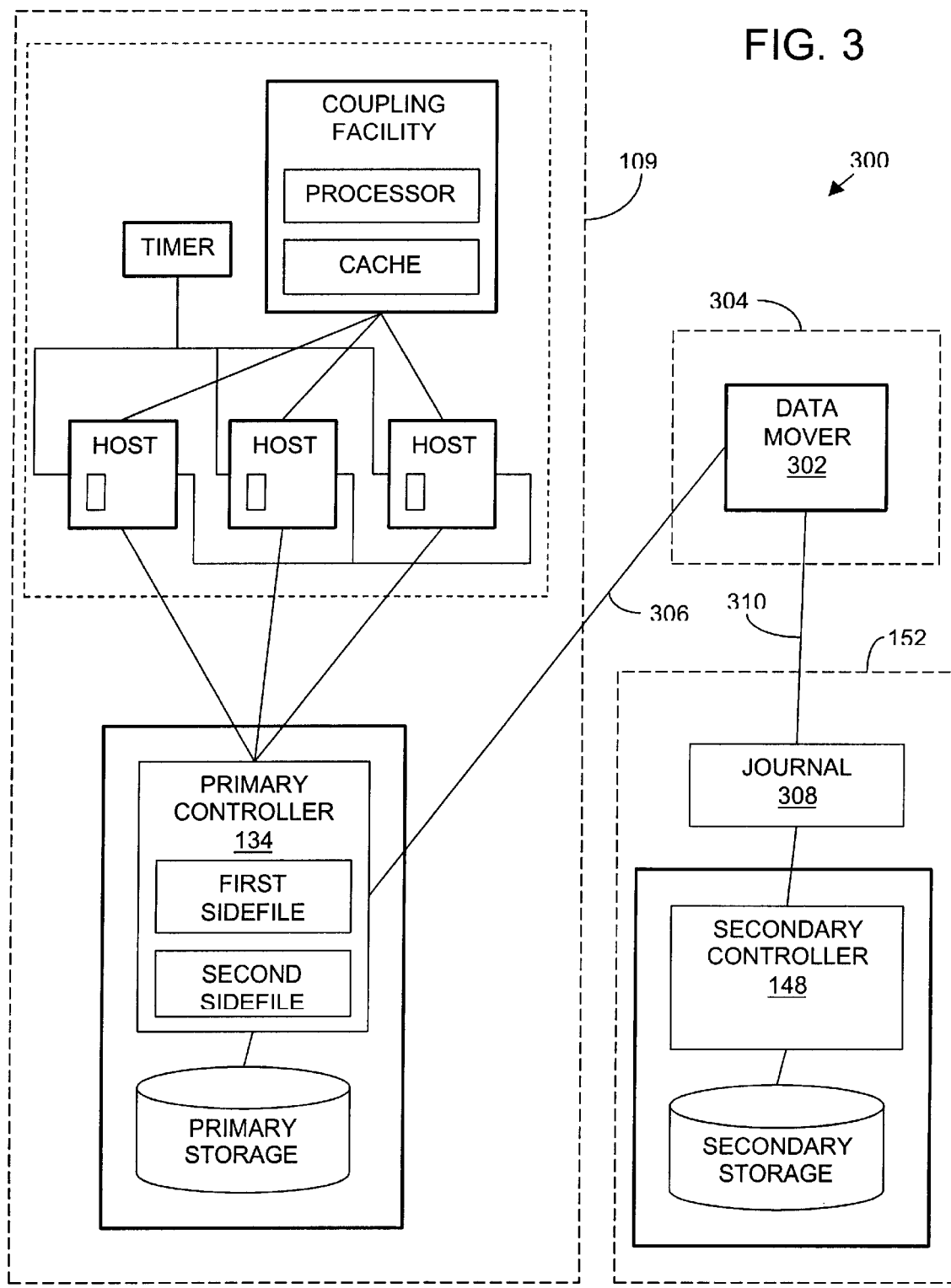

In another alternative system 300 shown in FIG. 3, the data mover 302 is located at a third site 304. In this alternative embodiment, the data mover 302 is coupled to the primary controller 134 by a link 306 such as an ESCON or FICON link or an extended link. The data mover 302 is coupled to the journal 308 by a link 310 such as an ESCON or FICON link, or an extended link. The journal 308 is coupled to the secondary controller 148. Alternatively, the journal 308 may be located at the third site 304, in the data mover 302, or separate from the data mover 302. Alternatively, there is no journal 308, and the data mover 302 is coupled directly to the secondary controller 148.

FOURTH EXAMPLE

Figure 4:
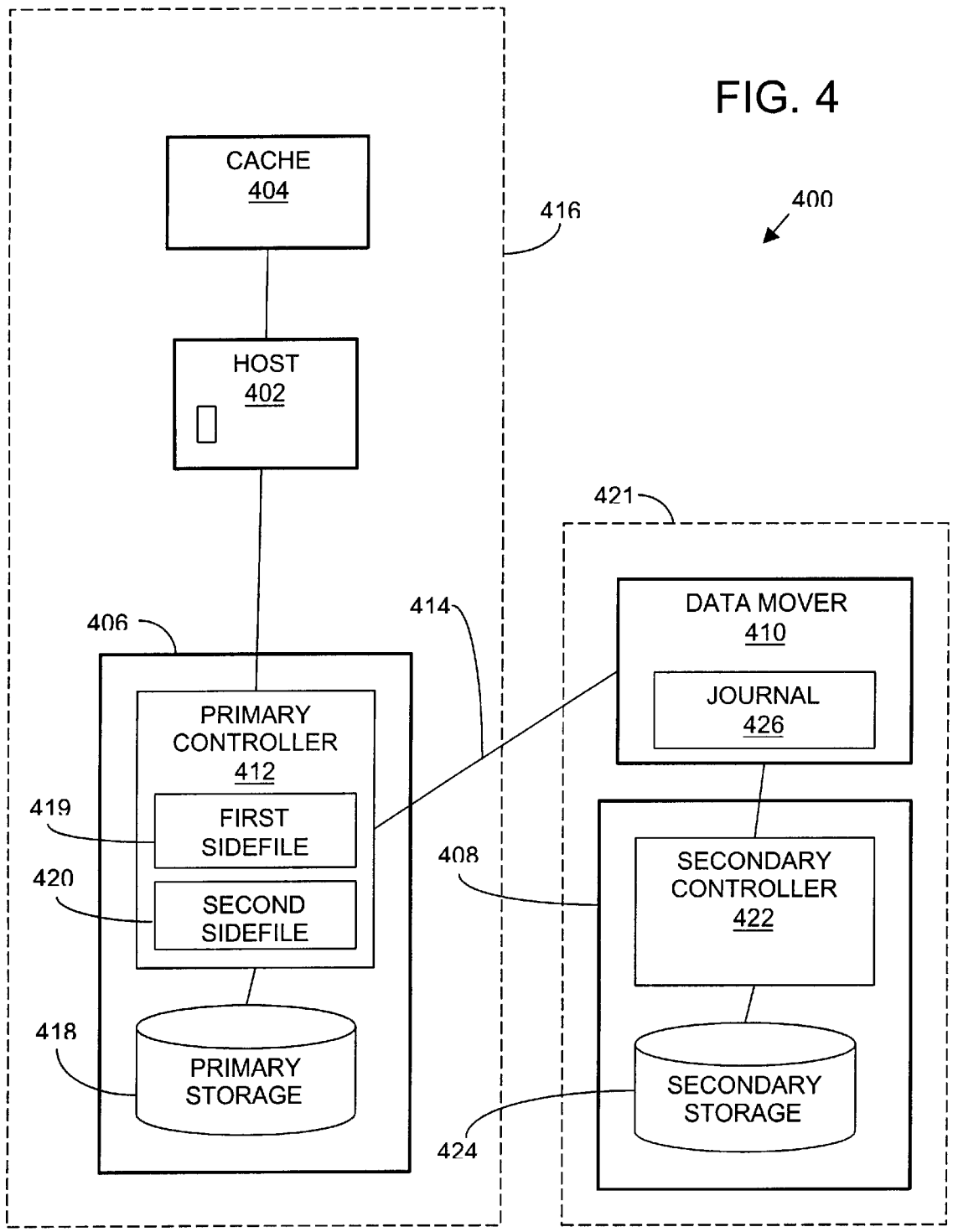

An alternative example is illustrated by the system 400 in FIG. 4. The system 400 includes a host 402, a cache 404, a primary storage subsystem 406, a secondary storage subsystem 408, and a data mover 410. In contrast to the system 100 in FIG. 1, in the system 400 of FIG. 4 the cache 404 is not part of a coupling facility, there is no timer, and there is only one host 402. Also, in the illustrated example of the system 400, a primary storage controller 412 is coupled to the data mover 410 with an ESCON or FICON link 414. Otherwise, the components, connections, and operation are generally the same in the system 400 as in the system 100. In an alternative embodiment of the system 400, a timer may be coupled to the host 402. Also, in an alternative embodiment, the primary controller 412 may be coupled to the data mover 410 with an extended link, as described above with reference to FIG. 1.

In the system 400 of FIG. 4, the host 402, the cache 404, and the primary storage subsystem 406 are located at a primary site 416. The primary storage subsystem 406 includes the primary controller 412, which is coupled to a primary storage 418. The primary controller 412 has a first sidefile 419 and a second sidefile 420. Alternatively, the primary controller may have only one sidefile, or may have more than two sidefiles. The host 402 is coupled to the cache 404 and to the primary controller 412. The cache 404 may be included in the host 402, or separate from the host 402. The secondary storage subsystem 408 is located at a secondary site 421. The secondary storage subsystem 408 includes a secondary storage controller 422, which is coupled to a secondary storage 424. The data mover 410 is coupled to the primary controller 412 and the secondary controller 422. In the illustrated example of the system 400, the data mover 410 includes a journal 426, and the data mover 410 is located at the secondary site 421. In alternative embodiments, the data mover 410 may be located at the primary site 416 or at a third site (not shown), and the journal 426 may be located at the primary site 416 or the third site, or omitted entirely.

Digital Data Processing Apparatus

Another aspect of the present disclosure concerns a digital data processing apparatus, which may be used to implement some or all of the digital data processing entities of the systems of FIGS. 1-4, such as the hosts 110, 112, 114, 402, data mover 108, 410, primary controller 134, 412, etc.

Figure 5:
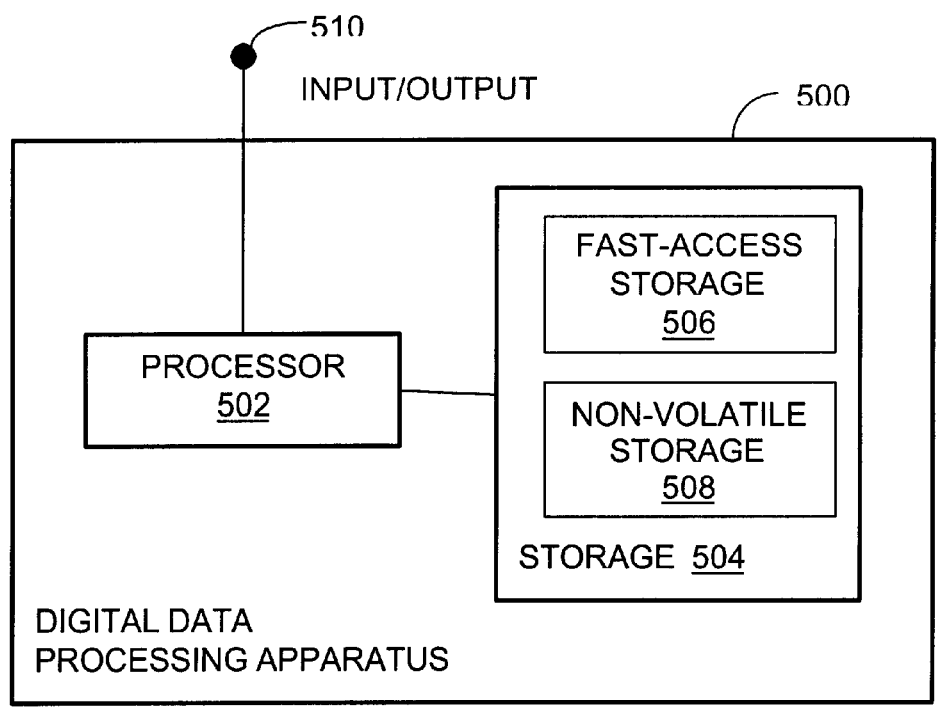
FIG. 5 is a block diagram of a digital data processing machine.

FIG. 5 shows an example of one digital data processing apparatus 500. The apparatus 500 includes a processor 502, such as a microprocessor or other processing machine, coupled to a storage 504. In the present example, the storage 504 includes a fast-access storage 506, as well as nonvolatile storage 508. The fast-access storage 506 may comprise random access memory, and may be used to store programming instructions executed by the processor 502. The nonvolatile storage 508 may comprise, for example, one or more magnetic data storage disks such as a "hard drive," an optical drive, a tape drive, or any other suitable storage device. The apparatus 500 also includes an I/O 510, such as a line, bus, cable, electromagnetic link, or other means for the processor 502 to exchange data with locations external to the apparatus 500.

Despite the specific foregoing description, ordinarily skilled artisans (having the benefit of this disclosure) will recognize that the apparatus discussed above may be implemented in a machine of different construction, without departing from the scope of the invention. For example, the fast access storage 506 or the nonvolatile storage 508 may be eliminated; furthermore, the storage 504 may be provided on-board the processor 502, or even provided externally to the apparatus 500.

As an example, the digital data processing apparatus 500 may be an IBM zSeries server.

Operation

In addition to the various hardware embodiments described above, a different aspect of the invention concerns a method of temporarily caching data for storage in a primary storage subsystem for asynchronous mirroring at a secondary storage subsystem without sacrificing timestamp information.

Signal-Bearing Media

In the context of FIGS. 1-5, such a method may be implemented, for example, by operating one or more of the illustrated hosts, data mover, and primary controller to execute respective sequences of machine-readable instructions, where one or more of these components are embodied by a digital data processing apparatus 500. These instructions may reside in various types of signal-bearing media. In this respect, one aspect of the present invention concerns signal-bearing media tangibly embodying program (s) of machine-readable instructions executable by at least one digital data processor to perform operations as described herein.

Figure 6:
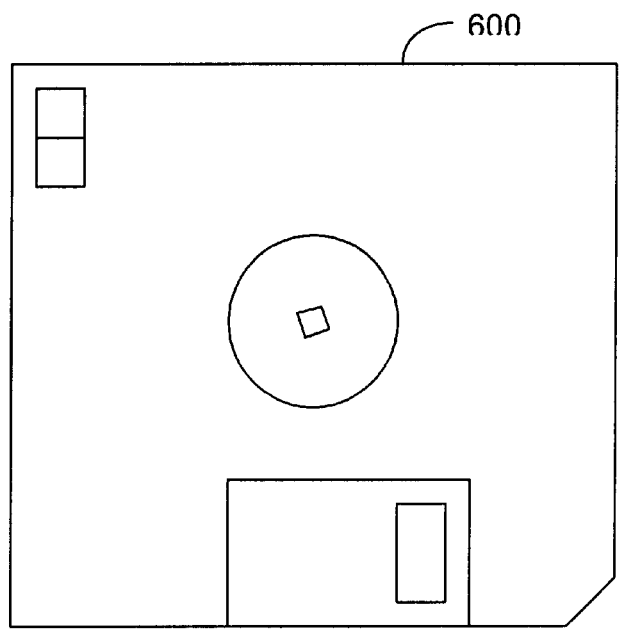
FIG. 6 shows an exemplary signal-bearing medium.

This signal-bearing media may comprise, for example, RAM (not shown) contained within the respective device as represented by the storage 504. Alternatively, the instructions may be contained in another signal-bearing media, such as a magnetic data storage diskette 600 shown in FIG. 6. Whether contained in the storage 504, diskette 600, or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Overall Sequence of Operation

Introduction

Figure 7A:
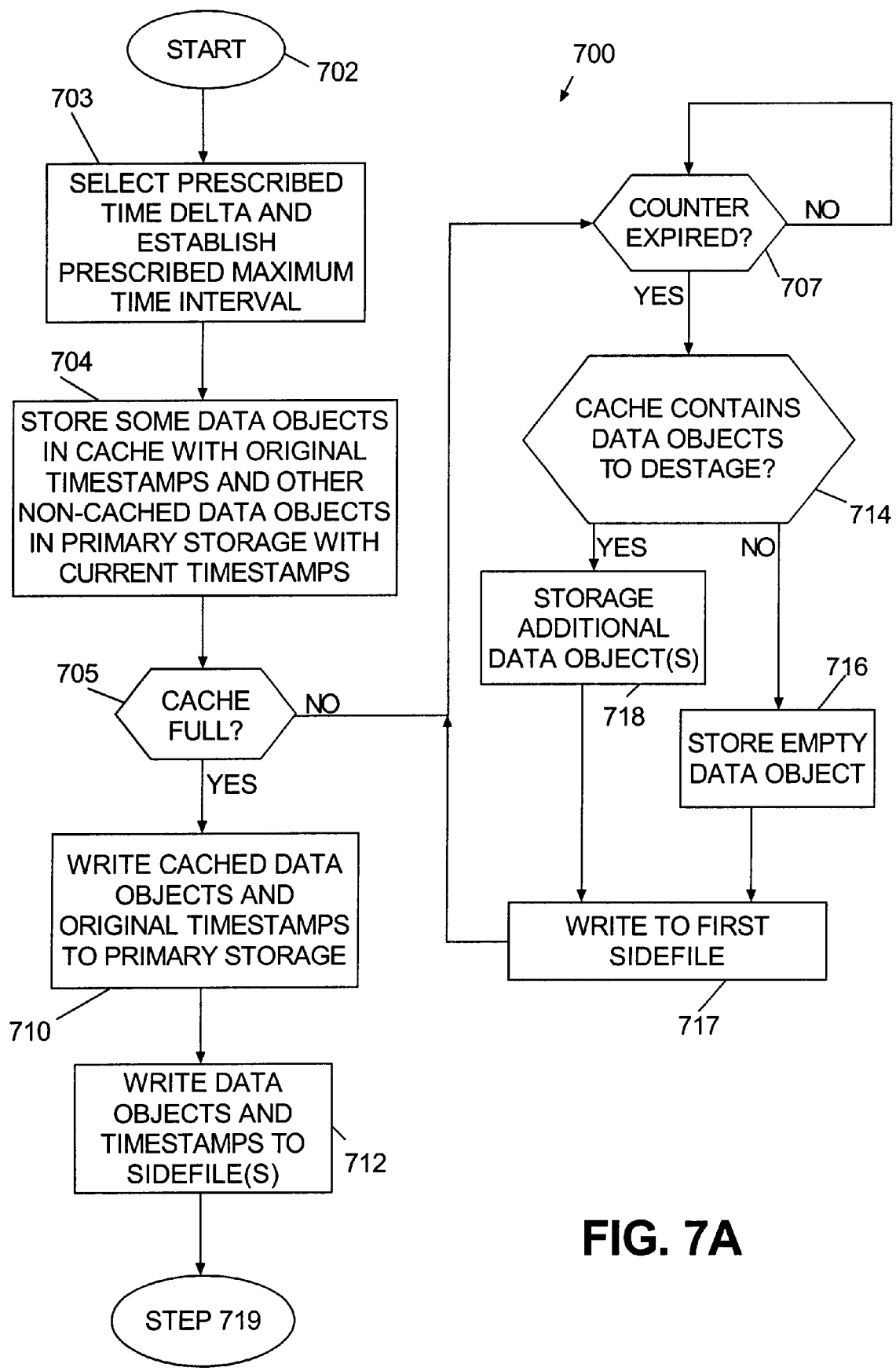
FIGS. 7A, 7B, and 7C are flowcharts of an exemplary sequence for temporarily caching data for storage in a primary subsystem for asynchronous mirroring at a secondary storage subsystem without sacrificing timestamp information.
Figure 7B:
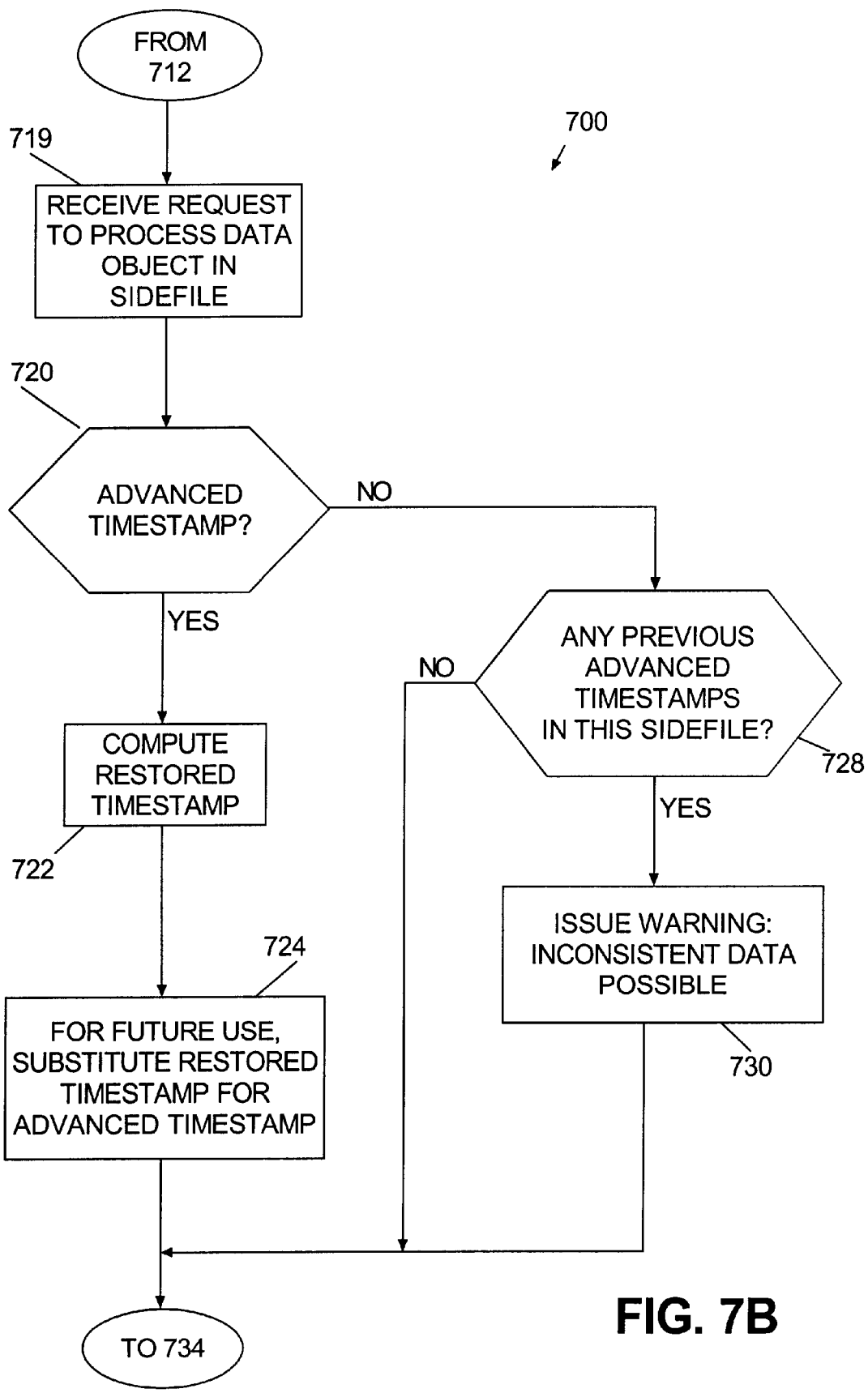
Figure 7C:
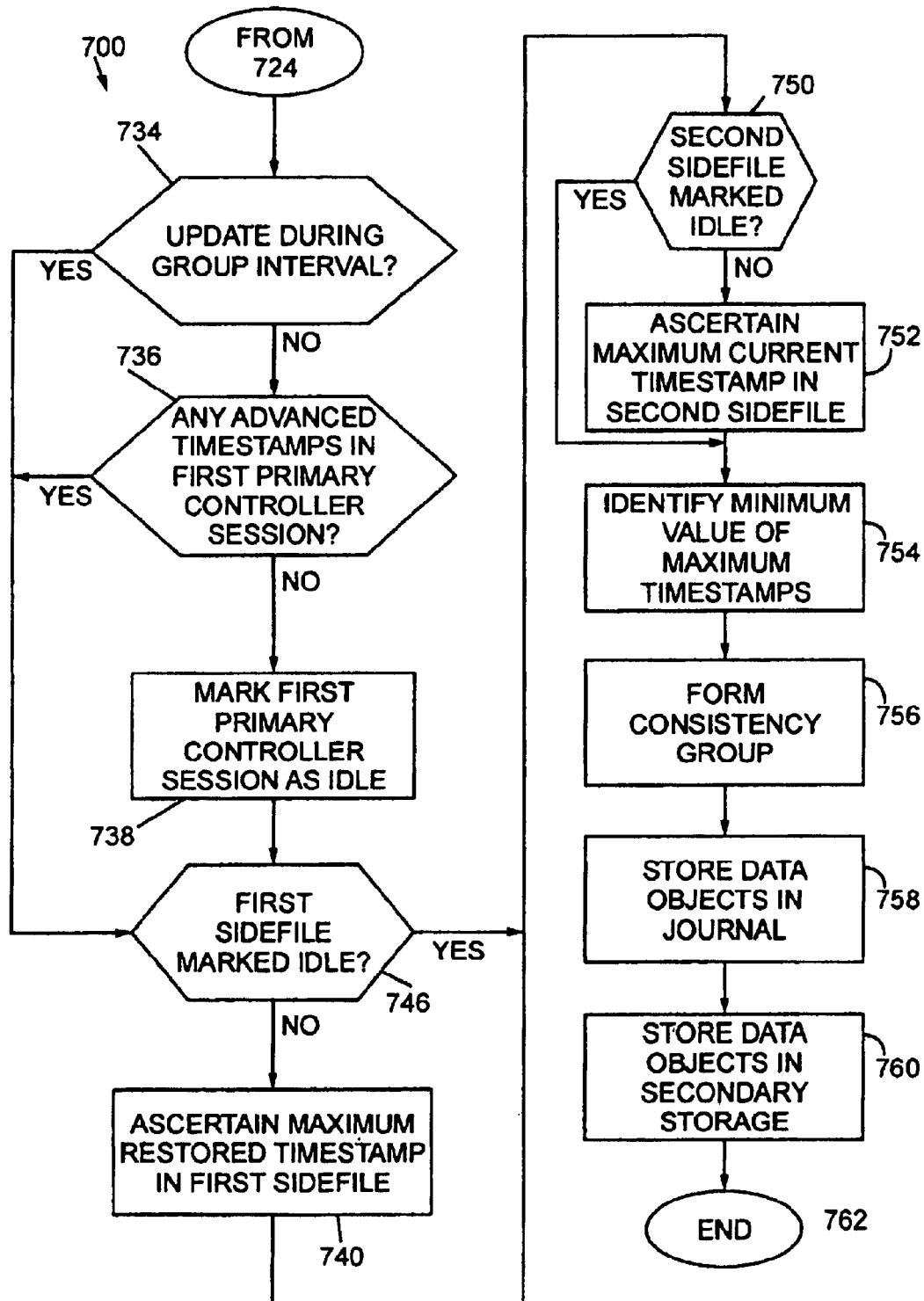

FIGS. 7A, 7B, and 7C show a sequence 700 to illustrate one example of the method aspect of the present disclosure. For ease of explanation, but without any intended limitation, the example of FIGS. 7A-7C is described in the context of the system 100 of FIG. 1 described above.

Startup, Configuration

The sequence 700 is initiated in step 702. Some setup steps are performed in step 703, which includes selecting a prescribed "time delta," and which also includes establishing a prescribed "maximum time interval" between destaging data objects from cache to the primary storage. These features and the factors related to selecting their values are discussed in greater detail below. Step 703 may be performed, for example, by personnel at the time of designing, installing, programming, reconfiguring, booting, or operating the system 100.

Writing Data Objects to Cache & Primary Storage

Step 704 is performed in response to the host applications generating, receiving, designating, or otherwise identifying data updates for storage. Although any host application running on any of the hosts 110, 112, 114 may supply updates (also called data objects), the example of host 110 is used for purposes of discussion. In step 704, the host 110 directs the coupling facility 120 to store some data objects in the cache 128, and also directs the primary controller 134 to store other data objects in the primary storage 136. The host 110 may direct such storage by sending data to the I/O routine 115a, for example. Although shown in sequence, step 704 may be repeated (not shown) as further data objects arrive or otherwise require storage in the subsystem 104.

Cached data objects are not stored in primary storage 136 at this point, since a later process serves to destage cached data objects to primary storage. Generally, any type of data object can be stored in the cache 128, and any type of data object can be stored "directly" in the primary storage 136 (via the primary controller). Although all of the data objects could be stored in the cache 128 (and none stored directly to primary storage 136) before being written to the primary storage 136, in many environments this would require a prohibitively large cache.

Along with each data object stored in cache 128 in step 704, the host 110 also directs the coupling facility 120 to store an original timestamp corresponding to the data object (or the coupling facility 120 automatically self-stores such a timestamp). The original timestamp represents a time that the data object was stored in the cache 128. As an example, a system logger facility may accomplish this step by storing metadata in the cache 128 including the actual time a log update was put in the cache 128. The actual time of the log update may be determined with reference to the system time generated by the timer 118.

Also in step 704, along with each data object stored in the primary storage 136, the host directs the primary controller 134 to store a current timestamp associated with the data object. The current timestamp represents a time that the data object is stored in the primary storage 136. As an example, the host 110 may store data objects and their timestamps (step 704) by invoking the START I/O EXIT routine, which is part of an Input Output Subsystem (IOS) component of the z/OS or MVS operating system. The START I/O EXIT routine takes the system timestamp from 118 at the time the START I/O EXIT routine is executed, and inserts this timestamp into a metadata field that is included in an I/O command given to the primary controller 134, directing the controller 134 to store the timestamp in storage 136. "Timestamp" includes any symbol or number indicating sequence or ordering, and is not limited to being an indication of time.

A "data object" may comprise one or more records, data structures, linked lists, tables, bitmaps, bytes, pages, files, or other data constructs. As an example, the host may strategically use the cache 128 to store data objects such as z/OS logger data, also called log data, and use the primary storage 136 to store data objects such as database table data. In this example, a system implementing remote data shadowing, for example with XRC, realizes improved performance by using a system logger facility that (quickly) writes logger updates to the cache 128 in the coupling facility 120 rather than (slowly) writing the logger updates "directly" to the primary storage 136. The system logger facility (not shown) may comprise, for example, software running on one or more of the hosts 110, 112, 114. Prior to this invention, storing logger data updates in the cache 128 would have precluded maintaining the logger updates in sequence consistent order with table updates that are written directly to the primary storage 136, and which are dependent on the logger data in the cache. However, one aspect of this disclosure facilitates maintaining the logger data in sequence consistent order with the table data.

In another example, data may reside in two or more open file systems, where data objects from one file system are temporarily stored in the cache 128, and data objects from another file system, which are dependent on the cached data objects, are written directly to the primary storage 136.

In still another example, the data objects may comprise audio information. In one specific example, data objects stored in the cache 128 come from one audio track, and data objects stored directly in the primary storage 136 come from another audio track. In another example, the data objects may comprise video and audio information, where the video is stored in the cache 128 and the audio is written directly to the primary storage 136, or vice versa.

Cache Destaging

Introduction

In step 705, the host 110 begins cache destaging. Generally, this entails the host 110 taking each cached data object and an "advanced" timestamp (described below) corresponding to the data object, and sending them to the primary controller 134 for storage in the primary storage 136. The controller 134 responds by writing the data objects and their corresponding advanced timestamps to storage 136.

The advanced timestamp is not the same as the original timestamp, but the original timestamp can be derived from the advanced timestamp. Broadly, each advanced timestamp is equal to the original timestamp plus a predetermined margin of sufficient amount so as to be recognizable as an advanced timestamp, and from which the original timestamp can be reliably derived. For example, each data object's advanced timestamp may be equal to its original timestamp plus a prescribed time delta. Considerations relating to selection of the prescribed time delta are discussed further below.

Schedule for Destaging

In step 705 the host 110 asks whether the cache 128 is full. Depending upon the needs of the application, "full" may be defined as completely full, a certain percentage of full, a prescribed margin from being full, etc. Cache fullness is evaluated in order to cache data for a longer period before invoking the primary storage 136, thereby taking advantage of the quickness of the cache and avoiding burdening the primary storage 136.

If the cache is "full," step 705 advances to step 710, which begins destaging the cache to primary storage 136, as discussed below. On the other hand, if the cache is not "full," step 705 advances to step 707, which begins a process of repeatedly sending a data object to primary storage 136 on a predetermined schedule, either a data object from the host (if one has been cached) or an empty data object (if the cache is empty).

Repeated writes to primary storage 136 are performed so that the time between sending any two data objects never exceeds a prescribed maximum time interval. In other words, a data object and corresponding advanced timestamp are written to the primary storage 136 at time intervals that never exceed a prescribed "maximum time interval." The preceding operations are discussed in greater detail below.

Destaging Details

As mentioned above, destaging occurs in step 710 if step 705 finds that the cache is full. In one embodiment, step 710 may be carried out by the host 110 invoking the I/O routine 115a. However, for each data object, the host 110 additionally passes the I/O routine 115a a special command causing the I/O routine 115a to send the data object with an advanced timestamp instead of its original timestamp.

The known START I/O EXIT routine (implemented as the I/O routine 115a) is conventionally utilized to send data objects from the host to the primary controller 134 for storage in 136 along with a "normal" timestamp that indicates the time the I/O routine 115a was invoked. However, the special command passed from the host 110 to the I/O routine 115a instructs the I/O routine 115a to send the data object with its advanced timestamp for storage by the controller 134, instead of using the normal timestamp. As an example, the special command may comprise an IOS command such the "define extent," "prefix," or another command that is part of the communication protocol between the host 110 and primary controller 134. As a more particular example, the host 110 may pass a parameter to the I/O routine 115a instructing the I/O routine 115a to place the corresponding advanced timestamp into the channel control word (CCW) associated with the write to the primary storage 136.

After completing step 710, having destaged data objects from cache 128 to primary storage 136, the host may delete the data objects from cache 128 to free-up cache storage to receive new data objects.

Reasons for Using Advanced Timestamp

Some remarks are now made regarding the use of advanced timestamps. The reason for storing the original timestamp (namely, the time that the data object is updated and stored in the cache 128) along with the data object in the cache 128 (step 704) is so that the actual time of the data update will be available when the data object is later processed by the data mover 108. As an example, this time may be useful when the data mover 108 places the data object in sequence consistent order with other data objects. The reason for replacing the original timestamp with the corresponding advanced timestamp (step 710) is that attempting to write to the primary storage 136 with the original timestamp would cause undesirable results. Namely, some environments will replace the original timestamp with a timestamp that is not correlated with the time that the data object was updated and written to the cache 128. Thus, the original timestamp would be lost when the data object is later processed.

More particularly, when the primary controller 134 writes a data object to the primary storage 136 and the data object has a timestamp that is earlier than the primary controller's last known timestamp, the primary controller 134 ignores the data object's existing timestamp and writes the data object to the primary storage 136 with a timestamp that is equal to the primary controller's last known timestamp plus a small amount of time. This ensures that succeeding writes to the primary controller 134 always have later timestamps than earlier writes, which avoids problems that would otherwise arise with XRC algorithms used to form consistency groups. However, replacing the original timestamp in this manner would result in the loss of the original timestamp representing the time that the data was updated and stored in the cache 128, because the replacement timestamp written by the primary controller 134 would not be related to the original timestamp.

Step 710 avoids this problem by using an advanced timestamp, which is guaranteed to be later than the storage controller session's last known timestamp. Also, since the advanced timestamp is a prescribed time delta greater than the original timestamp, the original timestamp can be easily reconstructed from the advanced timestamp. Namely, the prescribed time delta can later be subtracted from the advanced timestamp by the data mover 108 in step 722 (discussed below) to compute a restored timestamp, which is equal to the original timestamp, and which can be used when the data object is later processed by the data mover 108.

Choosing Time Delta

Having progressed in the discussion of the routine 700 sufficiently that the time delta now has more meaning, some additional explanation is now made of step 703. The minimum time for the prescribed time delta is subject to a number of constraints. Generally, delta must be sufficiently large so that the data mover 108 can distinguish advanced timestamps from non-advanced timestamps when reviewing the contents of primary storage 136. Delta must be greater than the maximum delay from the time that a data object is written to the cache 128 in step 704, to the time that the data object is written to the primary storage 136 in step 710, so that the sum of the original timestamp plus delta (which equals the advanced timestamp), will be greater than the system timestamp at the time the corresponding data object is written to the primary storage 136 in step 710. Delta must also be greater than the maximum delay from the time that a data object is written to the cache 128 in step 704, to the time that the data mover 108 ascertains whether or not the timestamp is an advanced timestamp in step 720 (discussed below). In other words, the sum of the original timestamp plus delta must be greater than the system timestamp at the time of performing step 720. Thus, the minimum value that can be used for delta based on the two preceding constraints relates to the size of the cache 128, because data from a smaller cache 128 has to be written to the primary storage more frequently than from a larger cache 128, to avoid filling up the cache 128. Also, delta must be larger than the minimum time between I/O operations (which is generally thousandths of a second). Delta must also be larger than any reasonable idle time during which updates are not written from applications. For example, delta may be a portion of a second, a second, a minute, an hour, a day, a month, a year, or any other value that satisfies these constraints in a particular implementation. If delta is too small, data inconsistencies can be introduced. Generally, a single value is used for delta, although delta may vary from timestamp to timestamp as long as the values of delta satisfy the constraints above. As an example, a system logger facility adds a time delta, for example 24 hours, to original timestamps to compute corresponding advanced timestamps, which are passed to the primary controller 134 and stored as the timestamps for corresponding logger data objects. In this example 24 hours was chosen as the value for delta, because in most systems 24 hours will satisfy all of the constraints above, and because a large value such as 24 hours facilitates easy recognition of an advanced timestamp.

Frequency of Cache Destaging

In contrast to the foregoing description, where step 705 found the cache to be full and proceeded to write the cached data objects to storage in step 710, step 705 goes to step 707 if the cache is not full. As mentioned above, the routine 700 waits to destage data objects until the cache is full or until a "counter" (described below) expires.

In step 707, the host 110 waits until a counter (not shown) expires before examining the cache 128 to possibly send any data objects to primary storage. This counter expires each time a predetermined interval passes, this interval referred to as the "maximum time interval." The counter is reset each time cached data is written to primary storage, for example, in steps 710, 718, 716. The counter, for example, may comprise a hardware or software component internal to the host or accessible to the host.

When the counter expires step 714 is performed. In step 714, the host 110 determines whether the cache 128 contains any data objects that have not been written to the primary storage 136, i.e., any "un-destaged" data objects. If not, then step 716 is performed. In step 716, the host 110 instructs the primary controller 134 to write an empty data object and corresponding advanced timestamp to the primary storage 136. A so-called "empty" data object may comprise a data object that only contains a metadata shell without any data, or contains a predetermined pattern or null content, etc. The empty data object does not have an original timestamp since it is not a real data object, and was never cached; thus, the empty data object's advanced timestamp comprises a sufficiently large count to be easily recognizable as an advanced timestamp and not an original timestamp; for example, the time delta added to the timer 118's current time may be used, or just the time delta. After sending the empty data object and timestamp to the primary controller in step 716, the host also clears the counter. For each empty data object and corresponding advanced timestamp that are written to primary storage, the primary controller 134 writes them to the first sidefile in step 717.

In contrast to step 716, if step 714 determines that the cache 128 contains any un-destaged data objects, then the host 110 (step 718) instructs the primary controller 134 to write the data objects and corresponding advanced timestamp(s) to the primary storage 136. After sending the data object and timestamp to the primary controller, also in step 718 the host clears the counter. After step 718, the primary controller 134 writes the data object and its advanced timestamp to the first sidefile 138 (step 717).

After step 717, whether arriving from step 716 or step 718, control returns to step 707 to wait for the counter to expire again. Step 707 ensures that one of steps 716, 718 is repeatedly performed at a sufficient rate so that data objects (whether empty or not) and corresponding advanced timestamps are written to the primary storage 136 separated by time intervals that do not exceed the prescribed maximum time interval.

In an alternative embodiment, even if step 714 detects that there are one or more additional data objects in the cache 128 that have not been written to the primary storage 136, step 718 may be delayed or skipped to accumulate data objects in cache. In this case, step 716 is performed instead. However, if the updates are allowed to accumulate in this manner, data may be lost if the capacity of the cache 128 is exceeded.

Considerations in Selecting Maximum Time Interval

In order for data objects in the cache to be included in the correct consistency groups, the prescribed maximum time interval must be no longer than the minimum group time interval used by the data mover 108 for forming consistency groups, minus any variability in the time the first primary controller 134 requires to write a data object (empty or nonempty) and corresponding timestamp to the first sidefile 138 after the data object is written to the primary storage 136. The group time interval used for forming consistency groups may vary because the data mover 108 may check for updates for forming consistency groups over a larger group time interval when a storage controller session is idle (for example every second, or every ten seconds) than when the storage controller session is not idle (for example every ¼ second). Additionally, there will generally be a small delay, for example a portion of a second, after the host 110 writes a data object and corresponding timestamp to the primary storage 136, before the primary controller 134 writes the data object and corresponding timestamp to the first sidefile 138. If this delay is not consistent from write to write, then in step 703 when the value of the prescribed maximum time interval is established, the value of the prescribed maximum time interval is reduced by an amount at least as great as the maximum variability in the delay, to ensure that succeeding writes of data objects and corresponding timestamps to the primary storage 136, which are separated by no more than the minimum group time interval, are also written to the first sidefile 138 at times that are separated by no more than the minimum group time interval.

Sidefile Update

In step 712, the primary controller 134 identifies data objects that were destaged in step 712 and stores these data objects and their advanced timestamps to the first sidefile 138. Likewise, and also in step 712, the primary controller 134 identifies the data objects that were stored in the primary storage 136 in step 704, and stores these data objects and their current timestamps to the second sidefile 140. These operations may occur separately, although illustrated together in step 712.

Sidefile Processing

Referring to FIG. 7B, in step 719 the data mover 108 receives a request to process a data object (referred to as the "current" data object) in the first sidefile 138. This request, for example, may be received from a processing subcomponent of the XRC program, and may therefore be generated within the data mover 108. As illustrated, the steps 719, 720, 728, 730, 722, 724 are performed to process the first sidefile 138. These steps are also repeated as needed (not shown) to process the second sidefile 140. For ease of discussion, however, explanation of steps 719, 720, 728, 730, 722 is limited to the first sidefile.

In step 720, the data mover 108 ascertains whether the timestamp in the first sidefile 138 corresponding to the current data object in the first sidefile 138 is an advanced timestamp. This is done by comparing the timestamp with the current system timestamp. Due to the constraints placed on the value of delta, if the sidefile timestamp is greater than the current system timestamp, the sidefile timestamp must be an advanced timestamp. Consequently, if the sidefile timestamp is greater than the current system timestamp, the data mover 108 identifies the sidefile timestamp as an advanced timestamp.

If step 720 determines that the sidefile timestamp is an advanced timestamp, in step 722 the data mover 108 subtracts the time delta from the sidefile timestamp to compute a restored timestamp (equal to the data object's original timestamp). For example, if the data object is identified as logger data, in step 722 the data mover 108 reduces the sidefile timestamp by the prescribed time delta (e.g., 24 hours), which was previously added to the original timestamp by the system logger facility running on the host 110 to compute the advanced timestamp. The data mover 108 then uses the newly calculated restored timestamp to calculate consistency (discussed below) between the logger data object and other data objects, for example table data, in a different controller session. Subtracting the time delta from the sidefile timestamp in step 722 ensures that the logger data has the correct timestamp, in relation to data updates from other controller sessions, that may be going to volumes in the same XRC controller session as the logger data.

After computing the restored timestamp in step 722, the data mover 108 substitutes the restored (original) timestamp for the advanced timestamp, so that the original timestamp will be used for all future operations requiring a timestamp for the subject data object (step 724). After step 724, the routine 700 may optionally end, or it may proceed to step 734 (FIG. 7C) to begin additional steps related to the formation of consistency groups.

Step 724 sharply contrasts with conventional sidefile processing. In known systems, data objects are generally processed in conjunction with corresponding "normal" timestamps. A normal timestamp indicates a time that the I/O routine 115a was executed to write the data object to primary storage 136. As an example of this, the current timestamps stored in the primary storage 136 with non-cached data objects in step 706 are such normal timestamps; these are used to subsequently process the non-cached data objects, as described in greater detail below. In contrast, step 724 ensures that, in future operations, the data mover 108 will processes the data object in the first sidefile 138 in conjunction with the restored (original) timestamp. Such future processing, as described in greater detail below, may include forming consistency groups of data objects. After step 724, the sequence 700 proceeds to step 734 (FIG. 7C).

In contrast to the foregoing description, if step 720 found that the timestamp of the current data object in the current sidefile is not an advanced timestamp, additional steps may (optionally) be performed to perform an error check. In this case, step 720 advances to step 728, where the data mover 108 asks whether any previous timestamp in the current sidefile has ever been found to be an advanced timestamp. The first sidefile, for example, should contain all advanced timestamps (since it is populated by data from cache), whereas the second sidefile contains no advanced timestamp (since it is populated by non-cached data). Thus, if step 728 finds that any past data object of the current sidefile has had an advanced timestamp (where the current data object did not, according to step 720), then the data mover 108 issues a warning in step 730. This warns of the possibility of inconsistent data, since the current sidefile contains data objects with both advanced and non-advanced timestamps, indicating that some data objects arose from cache and others did not. The warning may be issued to the host 110, primary controller 134, or any other entity as desired. After step 730, the routine 700 progresses to step 734 (FIG. 7C).

Formation of Consistency Groups

After step 724 (or step 730) of FIG. 7B, the routine 700 advances to step 734 of FIG. 7C in order to process and assemble data objects into consistency groups.

Identifying Idle Controller Session

A sequence of steps 734, 736, 738 is performed to identify and mark an idle controller session. In step 734 the data mover 108 determines if there was a data object update in the first primary controller session during a group time interval (which is the time interval corresponding to formation of a consistency group). The first sidefile 138 corresponds with the first primary controller session, and consequently step 734 comprises determining if there has been a data object update in the first sidefile 138 during the group time interval. Step 734 is accomplished by reading timestamps and data objects (which may include nonempty and empty data objects) in the first sidefile 138. If there was an update during the group interval, the controller session was not idle. Therefore, step 734 skips step 738 and goes to step 746, discussed below.

In step 736, the data mover 108 determines if any timestamp corresponding to a data object in the first primary controller session is an advanced timestamp. If so, the primary controller session was not idle. Accordingly, step 736 skips step 738 and proceeds to step 746, described below.

In contrast to the foregoing description, if there were not updates during the group interval, and there were no advanced timestamps in the first primary controller session, then step 738 is performed. Here, the data mover 108 marks the first primary controller session as idle. Although not shown for ease of discussion, steps 734, 736, and 738 are repeated as desired for each additional sidefile, such as the second sidefile 140.

Forming Consistency Groups

Additional steps will now be described regarding the formation of consistency groups of data objects. Consistency groups are groups of data updates over a group time interval, from different sidefiles that correspond to different storage controller sessions, which are grouped together so that the data updates can be maintained in sequence consistent order. Thus, updates occurring during the same group time interval in different controller sessions are grouped together, and are also placed in time sequence order within each group.

In step 746 the data mover 108 determines whether the first primary controller session is been marked idle. If so, the data mover 108 bypasses the first primary controller session when forming a consistency group for a group time interval, by skipping step 748. This action may also be referred to as bypassing the timestamp associated with the first primary controller session. On the other hand, if step 746 finds that the first primary controller session is not marked idle, step 748 is performed. In step 748, the data mover 108 ascertains, for a group time interval, a maximum restored timestamp corresponding to a data object in the first sidefile 138. The maximum restored timestamp is the greatest timestamp of any data object in the first sidefile 138.

Similarly, in step 750, if the second primary controller session has been marked idle, the data mover 108 bypasses the second primary controller session when forming the consistency group for the group time interval, by skipping step 752. If the second primary controller session has not been marked idle and bypassed, in step 752 the data mover 108 ascertains for the group time interval, a maximum current timestamp corresponding to a data object in the second sidefile 140.

Next, in step 754, the data mover 108 identifies the minimum value of the ascertained maximum timestamps from steps 748, 752. In step 756, the data mover 108 next forms a consistency group for the group time interval, where the consistency group includes data objects having restored timestamps and data objects having current timestamps, which are less than or equal to the identified minimum value from step 754. When a consistency group is formed, the data objects in the consistency group are placed in sequence consistent order with each other. As an example, the consistency groups are sent to the secondary site 152 to facilitate maintaining the data updates at the secondary site 152 in an order consistent with the order the data updates cause write I/O operations at the primary site 109. As another example, the data updates may be tracks of audio data. A first track may correspond to the first primary controller session. If the first track is quiet and therefore has no data updates, the first primary controller session is marked idle, and this results in the first track not being combined with other audio tracks during the time that the first track is quiet.

If only one primary sidefile is used in the XRC controller session, for example the first sidefile 138, then steps 750, 752, and 754 are omitted, and the maximum restored timestamp ascertained in step 748 is also used as the minimum value.

In step 758, the data objects of the consistency group are stored in the journal 168. Storing data in the journal 168 before storing the data in the secondary storage 154 permits recovering intermediate data from the journal 168 in the event of a disaster.

In step 760, the data objects of the consistency group are stored in the secondary storage 154. The data objects may be stored in the secondary storage 154 whether or not the data objects are also stored in a journal. As an example, the secondary storage 154 is a DASD located at the secondary site 152. In order to minimize the amount of data lost in a disaster, it is desirable to frequently perform the steps discussed above required to form consistency groups and copy updates at the primary site 109 to the secondary site 152. The sequence 700 ends in step 762.

Other Embodiments

While the foregoing disclosure shows a number of illustrative embodiments of the invention, it will be apparent to those skilled in the art that various changes and modifications can be made herein without departing from the scope of the invention as defined by the appended claims. For example although the invention has generally been described in the context of an asynchronous remote data shadowing system, the invention can also be advantageously employed with synchronous (for example PPRC) and semi-synchronous remote data shadowing systems, as well as in environments that do not utilize remote data shadowing. Furthermore, although elements of the invention may be described or claimed in the singular, the plural is contemplated unless limitation to the singular is explicitly stated.

What is claimed is:

1. A method for using timestamps to manage data, the method comprising the following operations:

storing some data objects in a cache and other non-cached data objects in a primary storage;

for each data object stored in the primary storage, writing a current timestamp to the primary storage representing a time that the data object was stored in the primary storage;

for each data object stored in the cache, placing in the cache an original timestamp corresponding to the data object, the original timestamp representing a time that the data object was stored in the cache;

writing data objects from the cache and corresponding advanced timestamps to the primary storage, where each advanced timestamp is equal to an original timestamp plus a prescribed time delta;

responsive to requests to apply a predetermined consistency group formation routine to identified data objects in the primary storage, for each data object, reading the advanced timestamp corresponding to the identified data object and subtracting the time delta therefrom to compute a restored timestamp, and then applying the routine to the identified data object in conjunction with the restored timestamp instead of the advanced timestamp.

2. The method of claim 1, further comprising repeating the writing operation at time intervals that do not exceed a prescribed maximum time interval.

3. The method of claim 1, the operations further comprising:

at least as often as a prescribed maximum time interval, determining if the cache contains any additional data objects that have not been written to the primary storage;

if so, writing the additional data objects from the cache and corresponding advanced timestamps to the primary storage, where each advanced timestamp is equal to an original timestamp plus a prescribed time delta;

if not, writing an empty record and a corresponding advanced timestamp to the primary storage and a sidefile, where the advanced timestamp is at least as large as the time delta.

4. The method of claim 1, where the operation of writing the data object and the corresponding advanced timestamp to the primary storage comprises:

invoking an input/output routine configured to write data objects to the primary storage along with a normal timestamp indicating the time the input/output routine is executed to write the data object to the primary storage, and passing the input/output routine a command instructing the input/output routine to write the corresponding advanced timestamp to the primary storage instead of the normal timestamp.

5. The method of claim 1, where the operations further comprise:

writing data objects and their corresponding advanced timestamps from the cache to a sidefile of the primary storage;

writing the non-cached data objects and their corresponding current timestamps to a sidefile of the primary storage;

marking a given set of one or more sidefiles as idle if (1) no data objects have been stored to the given set during a prescribed group time interval, and (2) no timestamp corresponding to a data object in given set is an advanced timestamp.

6. A method of temporarily caching data prior to storage in a primary storage subsystem for asynchronous mirroring at a secondary storage subsystem without sacrificing timestamp information, the method performed in a system including a host, the primary storage subsystem coupled to the host, a cache coupled to the host and separate from the primary storage subsystem, a secondary storage subsystem, and a data mover coupling the primary and secondary storage subsystems, the method comprising operations of:

the host identifying various data objects to store in the primary storage subsystem;

the host storing some of the identified data objects in the cache in association with original timestamps correlated to times of storage in the cache;

the host sending other of the identified data objects to the primary storage subsystem for storage therein, and the primary storage subsystem responding by storing the other data objects in association with current timestamps correlated to times of storage in the primary storage subsystem;

according to a predetermined schedule, the host sending cached data objects to the primary storage subsystem for storage therein and also including commands for the primary storage subsystem to store each data object in association with an advanced timestamp comprising the original timestamp associated with the data object increased by a predetermined margin, the predetermined margin being of sufficient amount so as to be recognizable as an advanced timestamp and an amount permitting derivation of the original timestamp from the advanced timestamp.

7. The method of claim 6, the operations further comprising:

responsive to the data mover commencing a prescribed process of preparing data objects in the primary storage subsystem for storage in the secondary storage subsystem, where the process is applied to a designated set of one or more data objects in the primary storage subsystem, performing operations comprising:

reviewing each data object in the set to determine whether its associated timestamp is an advanced timestamp or current timestamp;

if advanced, subtracting the predetermined margin from the advanced timestamp to restore the original timestamp, and conducting future processing of the data object utilizing the restored original timestamp;

if current, conducting future processing of the data object utilizing the current timestamp.

8. The method of claim 6, the operations further comprising:

the primary storage subsystem storing data objects in various sidefiles;

processing the sidefiles in order to form consistency groups, where the processing includes marking each sidefile as IDLE under conditions including the sidefile having at least one data object associated with an advanced timestamp.

9. At least one signal-bearing medium tangibly embodying a program of machine-readable instructions executable by at least one digital processing apparatus to perform a method for using timestamps to manage data, the method comprising the following operations:

storing some data objects in a cache and other, non-cached data objects in a primary storage;

for each data object stored in the primary storage, writing a current timestamp to the primary storage representing a time that the data object was stored in the primary storage;

for each data object stored in the cache, placing in the cache an original timestamp corresponding to the data object, the original timestamp representing a time that the data object was stored in the cache;

writing data objects from the cache and corresponding advanced timestamps to the primary storage, where each advanced timestamp is equal to an original timestamp plus a prescribed time delta;

responsive to requests to apply a predetermined consistency group formation routine to identified data objects in the primary storage, for each data object, reading the advanced timestamp corresponding to the identified data object and subtracting the time delta therefrom to compute a restored timestamp, and then applying the routine to the identified data object in conjunction with the restored timestamp instead of the advanced timestamp.

10. The medium of claim 9, further comprising repeating the writing operation at time intervals that do not exceed a prescribed maximum time interval.

11. The medium of claim 9, the operations further comprising:

at least as often as a prescribed maximum time interval, determining if the cache contains any additional data objects that have not been written to the primary storage;
  if so, writing the additional data objects from the cache and corresponding advanced timestamps to the primary storage, where each advanced timestamp is equal to an original timestamp plus a prescribed time delta;
  if not, writing an empty record and a corresponding advanced timestamp to the primary storage and a sidefile, where the advanced timestamp is at least as large as the time delta.

12. The medium of claim 9, where the operation of writing the data object and the corresponding advanced timestamp to the primary storage comprises:

invoking an input/output routine configured to write data objects to the primary storage along with a normal timestamp indicating the time the input/output routine is executed to write the data object to the primary storage, and passing the input/output routine a command instructing the input/output routine to write the corresponding advanced timestamp to the primary storage instead of the normal timestamp.

13. The medium of claim 9, where the operations further comprise:

writing data objects and their corresponding advanced timestamps from the cache to a sidefile of the primary storage;

writing the non-cached data objects and their corresponding current timestamps to a sidefile of the primary storage;

marking a given set of one or more sidefiles as idle if (1) no data objects have been stored to the given set during a prescribed group time interval, and (2) no timestamp corresponding to a data object in given set is an advanced timestamp.

14. At least one signal-bearing medium tangibly embodying a program of machine-readable instructions executable by at least one digital processing apparatus to perform operations of caching data prior to storage in a primary storage subsystem for asynchronous mirroring at a secondary storage subsystem without sacrificing timestamp information, the operations performed in a system including a host, the primary storage subsystem coupled to the host, a cache coupled to the host and separate from the primary storage subsystem, a secondary storage subsystem, and a data mover coupling the primary and secondary storage subsystems, the operations comprising:

the host identifying various data objects to store in the primary storage subsystem;

the host storing some of the identified data objects in the cache in association with original timestamps correlated to times of storage in the cache;

the host sending other of the identified data objects to the primary storage subsystem for storage therein, and the primary storage subsystem responding by storing the other data objects in association with current timestamps correlated to times of storage in the primary storage subsystem;

according to a predetermined schedule, the host sending cached data objects to the primary storage subsystem for storage therein and also including commands for the primary storage subsystem to store each data object in association with an advanced timestamp comprising the original timestamp associated with the data object increased by a predetermined margin, the predetermined margin being of sufficient amount so as to be recognizable as an advanced timestamp and an amount permitting derivation of the original timestamp from the advanced timestamp.

15. The medium of claim 14, the operations further comprising:

responsive to the data mover commencing a prescribed process of preparing data objects in the primary storage subsystem for storage in the secondary storage subsystem, where the process is applied to a designated set of one or more data objects in the primary storage subsystem, performing operations comprising:
  reviewing each data object in the set to determine whether its associated timestamp is an advanced timestamp or current timestamp;
  if advanced, subtracting the predetermined margin from the advanced timestamp to restore the original timestamp, and conducting future processing of the data object utilizing the restored original timestamp;
  if current, conducting future processing of the data object utilizing the current timestamp.

16. The medium of claim 14, the operations further comprising:

the primary storage subsystem storing data objects in various sidefiles;

processing the sidefiles in order to form consistency groups, where the processing includes marking each sidefile as IDLE under conditions including the sidefile having at least one data object associated with an advanced timestamp.

17. A data storage system, comprising:

a cache;

a primary storage;

a host programmed to perform operations comprising:
  storing some data objects in a cache and some data objects in the primary storage;
  for each data object stored in the cache, placing in the cache an original timestamp corresponding to the data object, the original timestamp representing a time that the data object was stored in the cache;
  writing data objects from the cache and corresponding advanced timestamps to the primary storage, where each advanced timestamp is equal to an original timestamp plus a prescribed time delta;

the primary storage programmed to perform operations comprising:
  for each data object stored in the primary storage, writing a current timestamp to the primary storage representing a time that the data object was stored in the primary storage;

a data mover, programmed to perform operations comprising, responsive to requests to apply a predetermined consistency group formation routine to identified data objects in the primary storage, for each data object, reading the advanced timestamp corresponding to the identified data object from the sidefile and subtracting the time delta therefrom to compute a restored timestamp, and then applying the routine to the identified data object in conjunction with the restored timestamp instead of the advanced timestamp.

18. A data storage system configured to temporarily cache data pending storage in a primary storage subsystem asynchronously mirrored at a secondary storage subsystem without sacrificing timestamp information, comprising:

a host;

a primary storage subsystem coupled to the host;

a cache coupled to the host and separate from the primary storage subsystem;

a secondary storage subsystem;

a data mover coupling the primary and secondary storage subsystems;

where the host, primary storage subsystem, and data mover are programmed to perform operations comprising:

the host identifying various data objects to store in the primary storage subsystem;

the host storing some of the identified data objects in the cache in association with original timestamps correlated to times of storage in the cache;

the host sending other of the identified data objects to the primary storage subsystem for storage therein, and the primary storage subsystem responding by storing the other data objects in association with current timestamps correlated to times of storage in the primary storage subsystem;

according to a predetermined schedule, the host sending cached data objects to the primary storage subsystem for storage therein and also including commands for the primary storage subsystem to store each data object in association with an advanced timestamp comprising the original timestamp associated with the data object increased by a predetermined margin, the predetermined margin being of sufficient amount so as to be recognizable as an advanced timestamp and an amount permitting derivation of the original timestamp from the advanced timestamp.

19. The system of claim 18, the operations further comprising:

responsive to the data mover commencing a prescribed process of preparing data objects in the primary storage subsystem for storage in the secondary storage subsystem, where the process is applied to a designated set of one or more data objects in the primary storage subsystem, performing operations comprising:

reviewing each data object in the set to determine whether its associated timestamp is an advanced timestamp or current timestamp;

if advanced, subtracting the predetermined margin from the advanced timestamp to restore the original timestamp, and conducting future processing of the data object utilizing the restored original timestamp;

if current, conducting future processing of the data object utilizing the current timestamp.

20. The system of claim 18, the operations further comprising:

the primary storage subsystem storing data objects in various sidefiles;

processing the sidefiles in order to form consistency groups, where the processing includes marking each sidefile as IDLE under conditions at least a condition where the sidefile includes at least one data object having an advanced timestamp.

21. A data storage system, comprising:

a cache;

a primary storage;

host means for performing operations comprising:

storing some data objects in a cache and some data objects in the primary storage;

for each data object stored in the cache, placing in the cache an original timestamp corresponding to the data object, the original timestamp representing a time that the data object was stored in the cache;

writing data objects from the cache and corresponding advanced timestamps to the primary storage, where each advanced timestamp is equal to an original timestamp plus a prescribed time delta;

a primary controller in the primary storage for performing operations comprising, for each data object stored in the primary storage, writing a current timestamp to the primary storage representing a time that the data object was stored in the primary storage;

data mover means for performing operations comprising, responsive to requests to apply a predetermined consistency group formation routine to identified data objects in the primary storage, for each data object, reading the advanced timestamp corresponding to the identified data object from the sidefile and subtracting the time delta therefrom to compute a restored timestamp, and then applying the routine to the identified data object in conjunction with the restored timestamp instead of the advanced timestamp.

* * * * *